US009932144B2

(12) United States Patent
Embleton et al.

(10) Patent No.: US 9,932,144 B2
(45) Date of Patent: Apr. 3, 2018

(54) FACTORY CONFIGURABLE SHOCK PALLET FOR VARIOUS INTEGRATED RACK WEIGHTS (71) Applicant: DELL PRODUCTS, L.P., Round Rock, TX (US)

(72) Inventors: Steven Embleton, Austin, TX (US); James Don Curlee, Round Rock, TX (US)

(73) Assignee: Dell Products, L.P., Round Rock, TX (US)

(*) Notice: Subject to any disclaimer, the term of this patent is extended or adjusted under 35 U.S.C. 154(b) by 378 days.

(21) Appl. No.: 14/633,506

(22) Filed: Feb. 27, 2015

(65) Prior Publication Data
US 2016/0251112 A1 Sep. 1, 2016

(51) Int. Cl.
G06F 19/00 (2011.01)
F16F 15/00 (2006.01)
B65D 19/00 (2006.01)
B25J 9/16 (2006.01)
G05B 19/408 (2006.01)

(52) U.S. Cl.
CPC ........ *B65D 19/0012* (2013.01); *B25J 9/1687* (2013.01); *G05B 19/4083* (2013.01); *B65D 2519/0099* (2013.01); *B65D 2519/00104* (2013.01); *B65D 2519/00273* (2013.01); *B65D 2519/00288* (2013.01); *B65D 2519/00318* (2013.01); *B65D 2519/00373* (2013.01); *B65D 2519/00572* (2013.01); *B65D 2519/00796* (2013.01); *B65D 2519/00815* (2013.01); *G05B 2219/31042* (2013.01); *Y10S 901/02* (2013.01)

(58) Field of Classification Search
CPC .... F16F 15/08; F16F 15/022; A61M 16/0622; B65R 55/20
USPC .......................................................... 700/95
See application file for complete search history.

(56) References Cited

U.S. PATENT DOCUMENTS

| | | |
|---|---|---|
| 5,195,439 A | 3/1993 | Harder |
| 5,970,886 A | 10/1999 | Knio |
| 6,105,511 A | 8/2000 | Bridges |
| 6,112,672 A | 9/2000 | Heil |
| 6,418,862 B1 | 7/2002 | Heil |
| 6,494,149 B1 | 12/2002 | DeGroot |
| 6,868,965 B2 | 3/2005 | Miller et al. |
| 7,219,609 B1 | 5/2007 | Utz et al. |
| 7,637,219 B2 | 12/2009 | Hartel et al. |

(Continued)

Primary Examiner — Michael J Brown
(74) Attorney, Agent, or Firm — Isidore PLLC (57) ABSTRACT A configurable shock pallet accommodates different types of rack-mounted information handling systems (IHSes) having different weight profiles. A bottom structure has a pair of parallel apertures to receive forklift tines. A top deck receives a rack-mounted IHS of a selected weight profile for shipping. A horizontal array of pad locations is designated between the bottom structure and the top deck. Dampening inserts are assigned to respective pad locations of the horizontal array from dampening inserts of different densities. Attaching components secure the top deck to the bottom structure, separated by the dampening inserts to provide appropriate shock protection for the weight and weight distribution of the IHS. A shock pallet configuring system can receive a weight profile and indicate on an output interface the assigned pad configuration to manually or automatically assemble the configured shock pallet.

19 Claims, 10 Drawing Sheets (56) References Cited

U.S. PATENT DOCUMENTS

| | | |
|---|---|---|
| 8,322,118 B2 | 12/2012 | Ozias et al. |
| 2007/0235911 A1* | 10/2007 | Robbins .................. B60N 2/501 267/136 |
| 2016/0061285 A1* | 3/2016 | Green .................... B65D 19/40 108/57.12 |

* cited by examiner

FACTORY CONFIGURABLE SHOCK PALLET FOR VARIOUS INTEGRATED RACK WEIGHTS

BACKGROUND

1. Technical Field

This disclosure generally relates to shipping of information handling systems (IHSes), and more particular to shock pallets for shipping IHSes.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An Original Equipment Manufacturer (OEM) of rack-mounted IHSes can ship hundreds of fully integrated racks a year. Each rack can contain up to $1M of Information Technology (IT) hardware. Each rack can range in weight from as little as 700 lbs. to over 3800 lbs. These fully integrated racks are required to survive the transportation environment worldwide by truck, plane, boat, and/or other transportation medium. A rack shock pallet is the primary protection for the IT hardware in the rack. To minimize complexity in the factory, currently a single shock pallet is designed for integrated racks. Multiple shock pallets drastically increases manufacturing and staging complexity. The single shock pallet is designed for a rack weight of 2800 lbs. using dense foam and wood. The engineering working range of foam is 1000 lbs. Therefore, the working range of the current shock pallet is from 2300 lbs. to 3300 lbs. For loads less than 2300 lbs., the shock pallet is too rigid to provide adequate dampening, imparting too much of impact motions on the IT equipment and rack frame. For loads more than 3300 lbs., the dense foam collapses due to the excessive weight, which also prevents the foam from providing adequate dampening.

Many failures have occurred that could have been prevented if the packaging had been optimized for the weight and weight distribution of the fully integrated rack. The types of failure experienced range from rack frames bending after impact events to casters seizing due to excessive vibration. These failures result in customer issues ranging from delayed delivery with a corresponding reduction in customer satisfaction to total scrapping of hardware with a total loss in the millions of dollars.

BRIEF SUMMARY

The illustrative embodiments of the present disclosure provide a shock pallet that may be configured with dampening inserts so that a configured shock pallet may be tuned to the correct damping range as a function of the rack weight. The proposed solution creates a shock pallet with removable dampening inserts such as dense foam. The dampening inserts are not limited to foam but could be made from other materials of differing damping ratios based on the weight requirements. The dampening inserts can also provide dimensional compliance by limiting to how far the dampening insert can be compressed. Varying the configuration can be based on the number and arrangement of dampening inserts as well as a particular density of the dampening insert. These dampening inserts can be removed or added based on the weight of the rack. The factory will only need to stock a bin of inserts and a single type of configurable shock pallets. The configurable shock pallet reduces inventory and part number complexity but still allows for an optimized solution. In the manual instruction documents or robotic instruction logic, a pad location configuration can designate the location of the dampening inserts. Different densities of foam may be stored on site in easily identifiable bins or robotic dispensing stations facilitating construction and deconstruction. Shock pallets assembled with this system can be easily refreshed as the foam, deck, and bottom structure are easily separated. A wide range of configurations can be readily assembled including for off-center loads.

According to at least one aspect of the present disclosure, a configurable shock pallet is provided to accommodate different types of rack-mounted information handling systems (IHSes) having different weight profiles. In one embodiment the configurable shock pallet includes a base or a bottom structure having a pair of parallel apertures to receive forklift tines. A top deck receives a rack-mounted IHS of a selected weight profile for shipping. A horizontal array of pad locations is designated between the bottom structure and the top deck. More than one dampening insert is assigned to respective pad locations of the horizontal array. Each dampening insert has a density that is selected from more than one available density. Attaching components secure the top deck to the bottom structure, separated by the more than one dampening insert.

According to at least one aspect of the present disclosure, a shock pallet configuring system is provided to configure a shock pallet for accommodating different types of rack-mounted IHSes having different weight profiles. In one embodiment, the method includes an input interface that receives a weight profile of a selected type of rack-mounted IHS to be shipped. A memory contains more than one pad configuration that corresponds to a selected weight profile of a rack-mounted IHS and that designates a selected density of dampening insert assigned to respective pad locations of a horizontal array. A processor is in electronic communication with the memory and the input interface. The processor receives the weight profile and determines the assigned pad configuration for the weight profile. The assigned pad configuration designates a dampening insert having a selected density for each pad location in a horizontal array in a shock pallet. An output interface indicates the assigned pad configuration to effect assembly of the configured shock pallet.

According to at least one aspect of the present disclosure, a method is provided of configuring a shock pallet for accommodating different types of rack-mounted IHSes having different weight profiles. In one embodiment, the method includes determining a weight profile of a selected type of rack-mounted IHS to be shipped. The method includes accessing a pad configuration that designates a dampening insert having a selected density for each pad location of a horizontal array and that corresponds to the weight profile. The method includes positioning the dampening inserts of selected density according to the accessed pad configuration on a bottom structure. The method includes attaching a top deck to the bottom structure, which secures the positioned dampening inserts between the bottom structure and the top deck.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The present disclosure provides a configurable shock pallet that accommodates different types of rack-mounted information handling systems (IHSes) having different weight profiles. A bottom structure has a pair of parallel apertures to receive forklift tines. A top deck receives a rack-mounted IHS of a selected weight profile for shipping. A horizontal array of pad locations is designated between the bottom structure and the top deck. Dampening insert are assigned to respective pad locations of the horizontal array from dampening inserts of different densities. Attaching components secure the top deck to the bottom structure, separated by the dampening inserts to provide appropriate shock protection for the weight and weight distribution of the IHS. A shock pallet configuring system can receive a weight profile and indicate on an output interface the assigned pad configuration to manually or automatically assemble the configured shock pallet.

The present disclosure provides a configurable shock pallet system and method for assembling the configurable shock pallet to address a number of requirements and features for placement of dampening inserts at appropriate pad locations on the bottom structure. Dampening inserts are of various densities, including a non-yielding density, for compliance. Compliance is a dimensional limit on how far the dampening insert is allowed to compress such as including a non-compressive material. Separate damping and compliance components may be joined into a single element or used separately. For example, the compliance component can limit how much the more resilient densities allow the IHS to tip when tilted or impacted. A pad configuration can address requirements that are a function of rack weight and COG. Multiple dampening inserts and locations may be designated to optimize damping efficiency. Total effective damping may be offset to account for an offset COG. Dampening inserts may be organized to reduce transient vibrations, flexing of the pallet deck, etc. Density of the dampening inserts can be readily machine readable or visually indicated such as by color. Dampening inserts of a particular density can be segregated in identifiable bins. Bins can allow for easy sorting, installation, uninstallation, organizing, ordering replacements, and recycling. The configurable shock pallet can be modular and readily disassembled to allow for placement of dampening inserts into predesignated locations. The top deck and bottom structure of the configurable shock pallet can be easily secured together thereby constraining the dampening inserts in between. The dampening inserts are substantially enclosed in a manner that survives the transportation environment. Top deck, dampening inserts and bottom structure may be refreshed separately when damaged or when the item/s exceed an estimated service life. Top deck, dampening inserts and bottom structure can have separate life cycles. Icons on the configurable shock pallet can be visible during integration, aligning orientation with specification document and defining placement of rack. Dampening inserts may have marks, icons, colors, etc., indicating properties (damping, compliance). The dampening inserts can have indicators for service lifetime and number of uses.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is designated by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
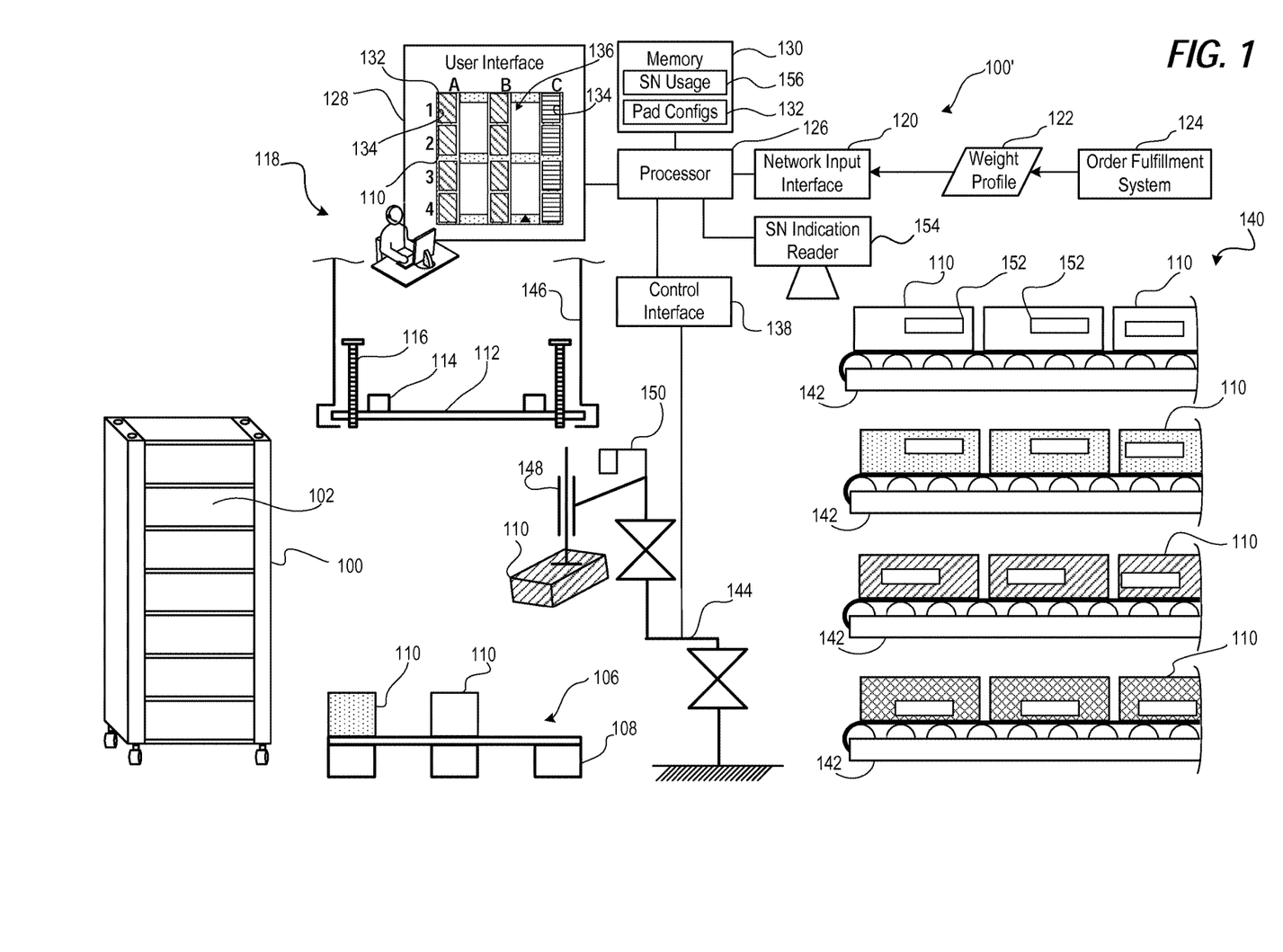
FIG. 1 illustrates a diagrammatic view of a rack mounted information handling system (IHS) of a fully integrated rack having a specifically configured shock pallet assembled by a configurable shock pallet system, according to one or more embodiments.

FIG. 1 illustrates a block diagram representation of an example IHS 100 that includes servers 102 installed into a rack frame 104 and interconnected with communication and power cabling to form a fully integrated rack. Servers 102 can include switching, power, and cooling components. The IHS 100 has a weight profile of total weight, center of gravity (COG), weight distribution, height, footprint, etc., that dictates requirements for a configurable shock pallet 106 for shipping. The shock pallet 106 includes a base or bottom structure 108, dampening inserts 110, a top deck 112 having guides 114, and attaching components 116. In one embodiment, a configurable shock pallet system 118 configures the configurable shock pallet 106 for the IHS 100 as well as for other fully integrated racks having different weight profiles. The configurable shock pallet system 118 includes an IHS 100' that performs automation for assembly of the configurable shock pallet 106. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The shock pallet configuring system 118 can include a network input interface 120 that receives a weight profile 122 from an order fulfillment system 124 for the IHS 100 of a selected type of rack-mounted IHS to be shipped. Alternatively, a processor 126 that communicates with the network input interface 120 can also receive the weight profile 122 as a user input to a user interface 128. A memory 130 contains more than one pad configuration 132 that corresponds to a selected weight profile 122 of a rack-mounted IHS 100 and designates a selected density of dampening insert 110 assigned to respective pad locations 134 of a horizontal array 136. The processor 126 receives the weight profile 122. The processor 126 determines the assigned pad configuration 132 for the weight profile 122. The assigned pad configuration is selected from more than one pad configuration 132. Each pad configuration designates a dampening insert 110 having a selected density for each pad location 134 in the horizontal array 136 in the configurable shock pallet 106. The processor 126 causes an output interface that can include a robotic control interface 138 to indicate the assigned pad configuration 132 to effect assembly of the configured shock pallet 106. In one embodiment, at least portions of the assembly of the configurable shock pallet 106 are manual. The output interface can thus include an indicated pad configuration 132 on the user interface 128. The robotic control interface 138 directs a robotic assembly apparatus 140 to assemble portions or the entirety of the configurable shock pallet 106. In one embodiment, the robotic assembly apparatus 140 includes bins or dampening insert conveyors 142 that each contain dampening inserts 110 of a particular density. The robotic assembly apparatus 140 includes a robotic arm 144 for placing each dampening insert 110 at an assigned pad location 134. The robotic assembly apparatus 140 includes a pallet lifting system 146 to position the bottom structure 108, the top deck 112, or the configurable shock pallet 106. The robotic arm 144 can include a pick end effector 148 for pneumatically, mechanically, or electrostatically gripping the dampening insert 110. The robotic arm 144 can further include an end effector 150 for disengaging or engaging the attaching component 116.

In one embodiment, each dampening insert 110 can include a serial number (SN) indicator 152 such as a barcode, a Radio Frequency Identifier (RFID), or a printed serial number. The shock pallet configuring system 118 can include a SN indication reader 154 to read the SN indicators 152. The memory 130 can contain SN usage tracking data 156 of uses of each dampening insert 110 that is associated with a particular SN indicator 152. The processor 126 is in electronic communication with the SN indicator reader 154 and the memory 130 to determine whether a particular dampening insert 110 is available or has already been used a threshold number of times.

Figure 2:
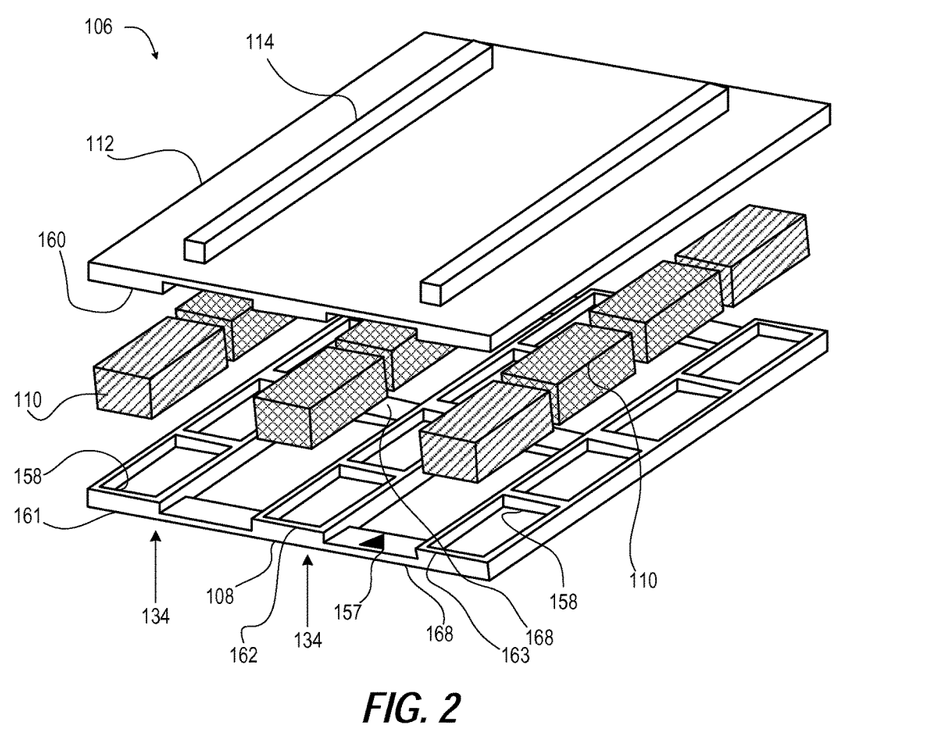
FIG. 2 illustrates a perspective view of a configurable shock pallet of FIG. 1 that is disassembled to allow configuring of specific dampening inserts for a weight profile of the rack-mounted IHS, according to one or more embodiments.
Figure 3:
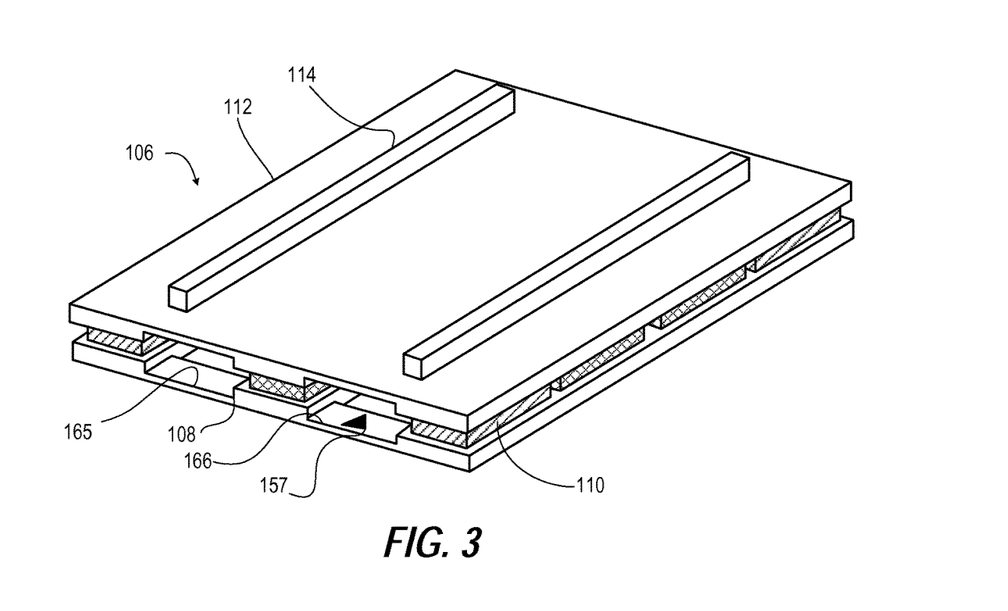
FIG. 3 illustrates a perspective view of the configurable shock pallet of FIG. 2 as assembled, according to one or more embodiments.
Figure 4:
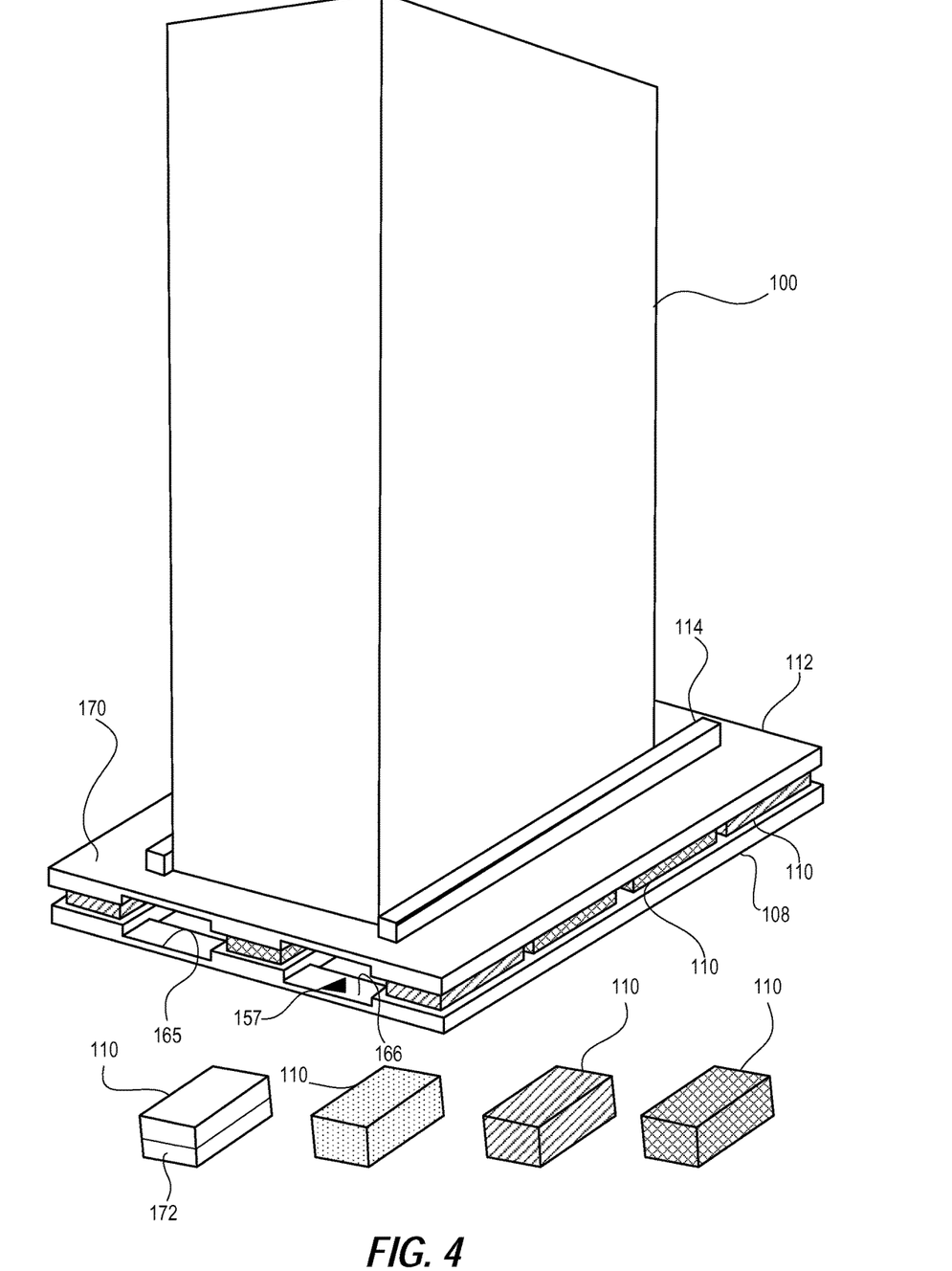
FIG. 4 illustrates the rack-mounted IHS placed on the configurable shock pallet of FIG. 3, according to one or more embodiments.

FIGS. 2-4 illustrate the shock pallet 106 including the bottom structure 108, dampening inserts 110, and top deck 112 having guides 114. An orientation indicator 157 can be attached to one of the bottom structure 108 and the top deck 112 to assist in properly orienting the pad configuration 132 and an IHS 100 (FIG. 4) for pad configurations 132 and weight profiles 122 that are respectively asymmetric.

FIG. 2 illustrates that the bottom structure 108 includes an upwardly open receptacle 158 at each pad location 134 to receive a provisioned dampening insert 110. The top deck 112 includes a downwardly open receptacle 160 at each pad location 134 that corresponds to an upwardly open receptacle 158 in the bottom structure 108 to secure the provisioned dampening insert 110 between the bottom structure 108 and the top deck 112. The bottom structure 108 includes left, center and right longitudinal members 161-163 that are separated by a pair of parallel apertures 165-166 that are sized to receive forklift tines. The left, center and right longitudinal members 161-163 each include four (4) longitudinally-aligned, upwardly open receptacles 158 that are rectangular. Cross stringers 168 are attached respectively to each of the left, center and right longitudinal members 161-163 and cross under the pair of parallel apertures 165-166. Each density of dampening insert 110 can be associated with a color that is indicated on the dampening insert 110 and that is used in conveying the pad configuration 132 to a user on the user interface 128 (FIG. 1). Alternatively, the colored pad configuration can be conveyed in a user reference document.

FIG. 3 illustrates the configurable shock pallet 106 assembled or reassembled according to the pad configuration 132. FIG. 4 illustrates an IHS 100 that is supported by the configurable shock pallet 106 and is in lateral contact with the pair of top guides 114 that are attached to a top surface 170 of the top deck 112 to laterally locate and stabilize the rack-mounted IHS 100. One or more of the dampening inserts 110 can include or wholly comprise a compliance element 172 that has a generally-unyielding density.

Figure 5:
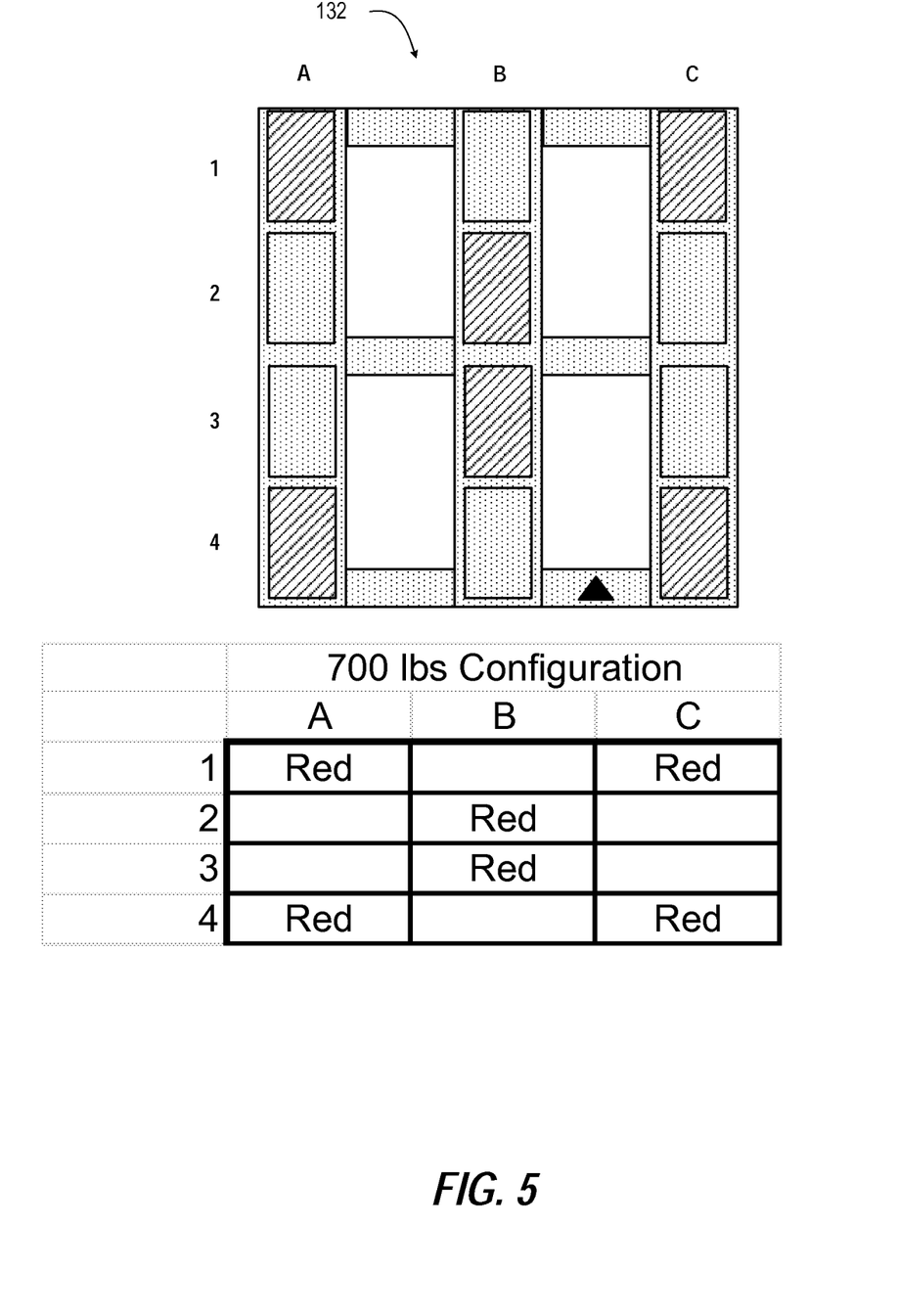
FIG. 5 illustrates a pad configuration for a configurable shock pallet that supports a range of weights around 700 lbs., according to one or more embodiments.
Figure 6:
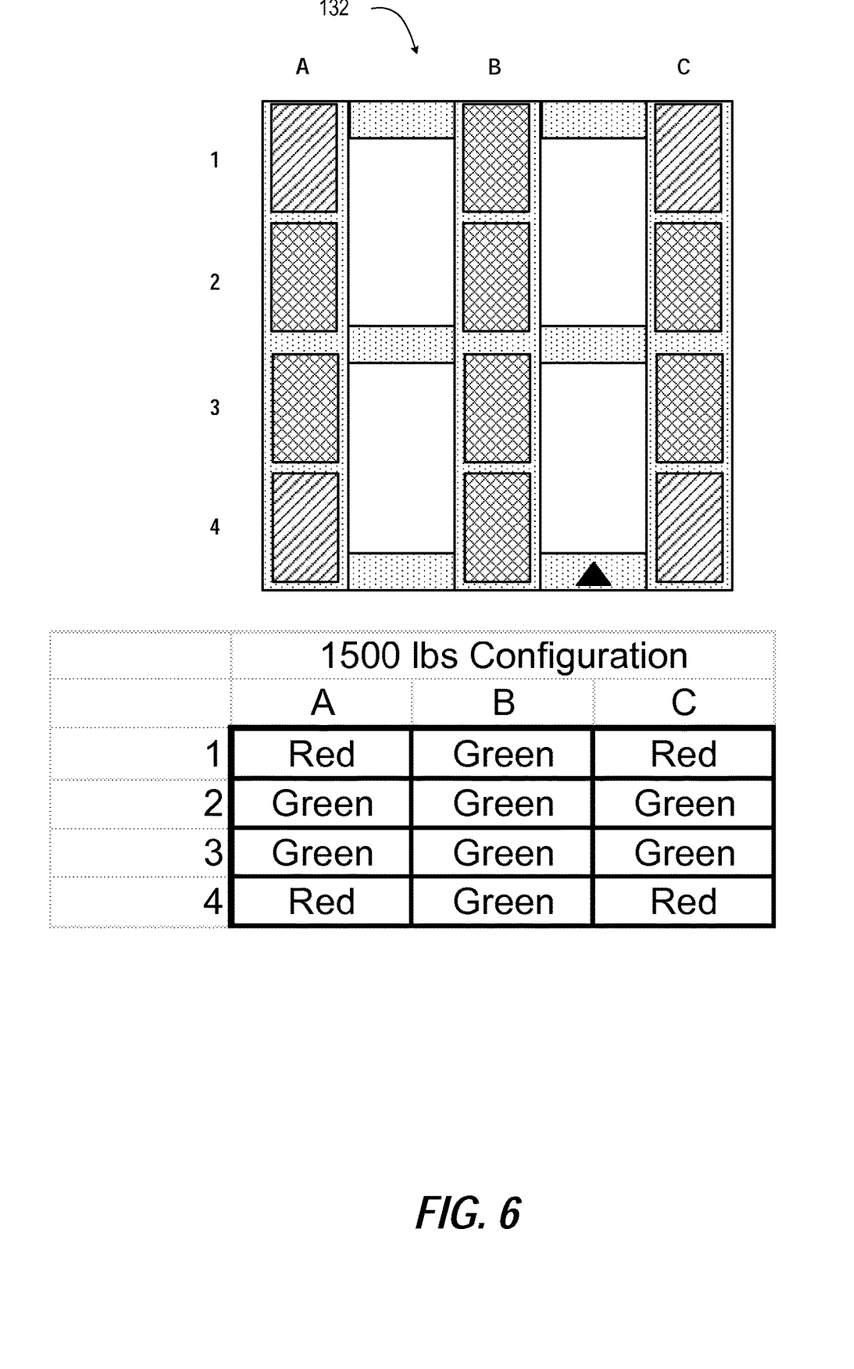
FIG. 6 illustrates a pad configuration for a configurable shock pallet that supports a range of weights around 1500 lbs., according to one or more embodiments.
Figure 7:
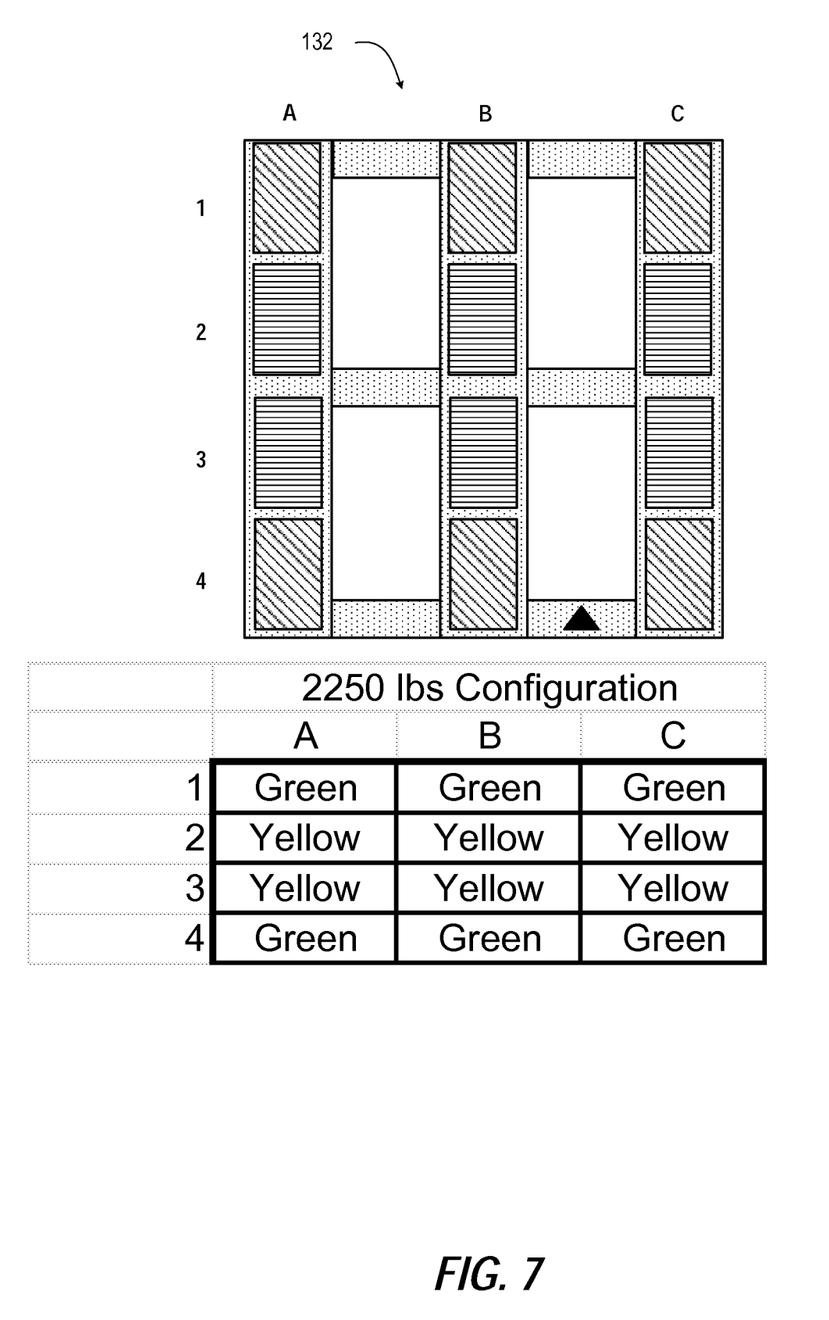
FIG. 7 illustrates a pad configuration for a configurable shock pallet that supports a range of weights around 2250 lbs., according to one or more embodiments.
Figure 8:
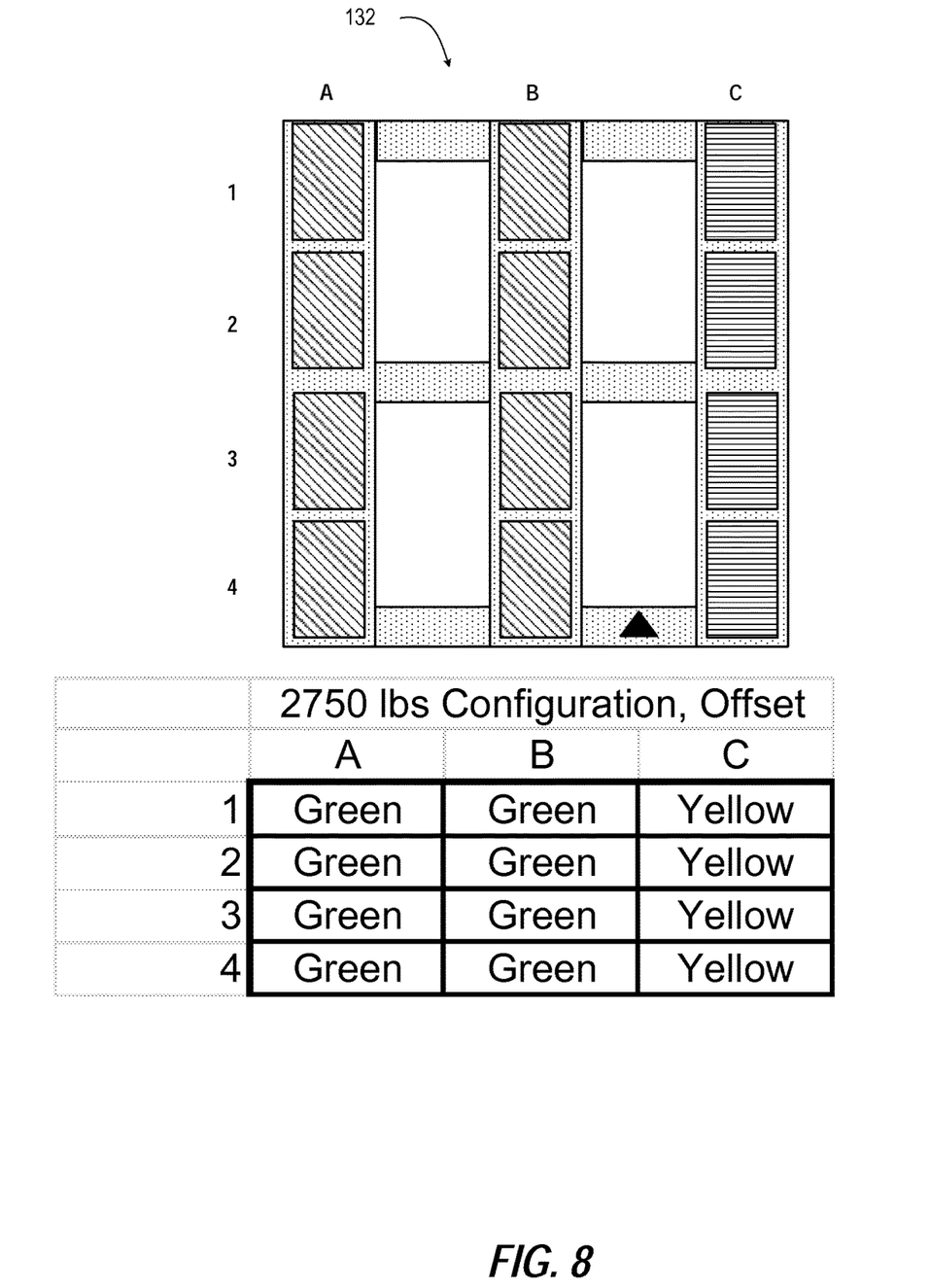
FIG. 8 illustrates a pad configuration for a configurable shock pallet that supports a range of weights around 2750 lbs., offset, according to one or more embodiments.

FIGS. 5-8 illustrate examples of pad configurations 132 wherein the densities of dampening inserts 110 are indicated by colors red, yellow, and green or by leaving empty a pad location 134 that is indexed by longitudinal columns A-C and lateral rows 1-4. FIG. 5 illustrates a 700 lbs. configuration with red in A1, A4, B2, B3, C1, and C4. FIG. 6 illustrates a 1500 lbs. configuration with red in A1, A4, C1 and C4 and green in A2, A3, B1, B2, B3, B4, C2 and C3. FIG. 7 illustrates a 2250 lbs. configuration with green in A1, A4, B1, B4, C1, and C4 and yellow in A2, A3, B2, B3, C2 and C3. FIG. 8 illustrates a 2750 lbs. offset configuration with green in A1, A2, A3, A4, B1, B2, B3, B4 and yellow in C1, C2, C3 and C4.

Figure 9:
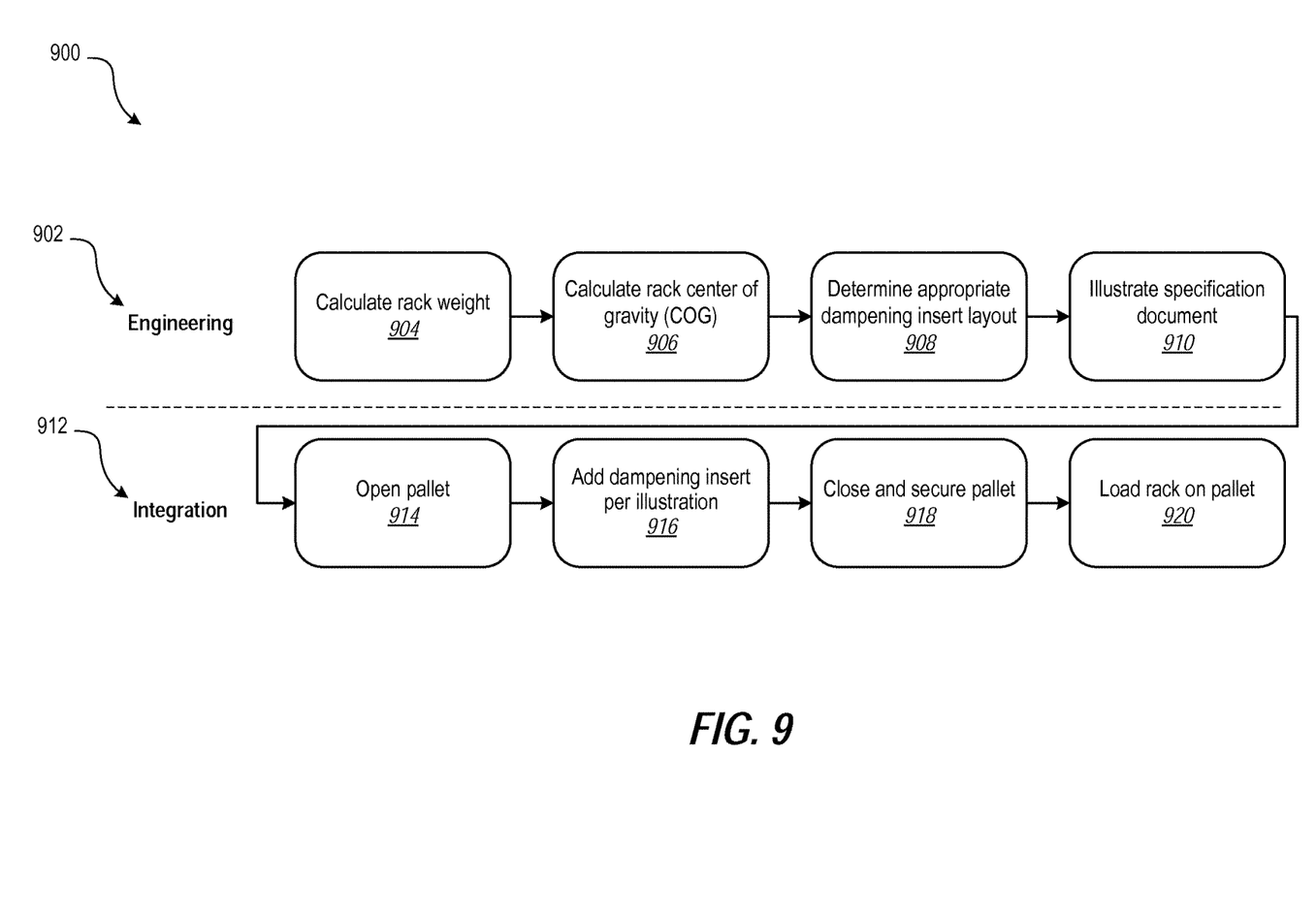
FIG. 9 illustrates a flow diagram of a method of creating and using pad configurations to configure a shock pallet for a weight profile of a rack-mounted IHS, according to one embodiment.

FIG. 9 illustrates a method 900 of creating and using pad configurations to configure a shock pallet for a weight profile of a rack-mounted IHS. An engineering phase 902 includes calculating or empirically determining a rack weight of a particular fully integrated rack (block 904). The rack center of gravity (COG) is calculated or empirically determined (block 906). The appropriate dampening insert layout is determined (block 908). The pad configuration layout is designated for automated assembly or illustrated in a specification document for manual assembly (block 910). In an integrattion phase 912, a pallet is opened for configuration (block 914). Dampening inserts are added per the illustration (block 916). The pallet is closed and secured (block 918). The rack is loaded on the pallet (block 920).

Figure 10A:
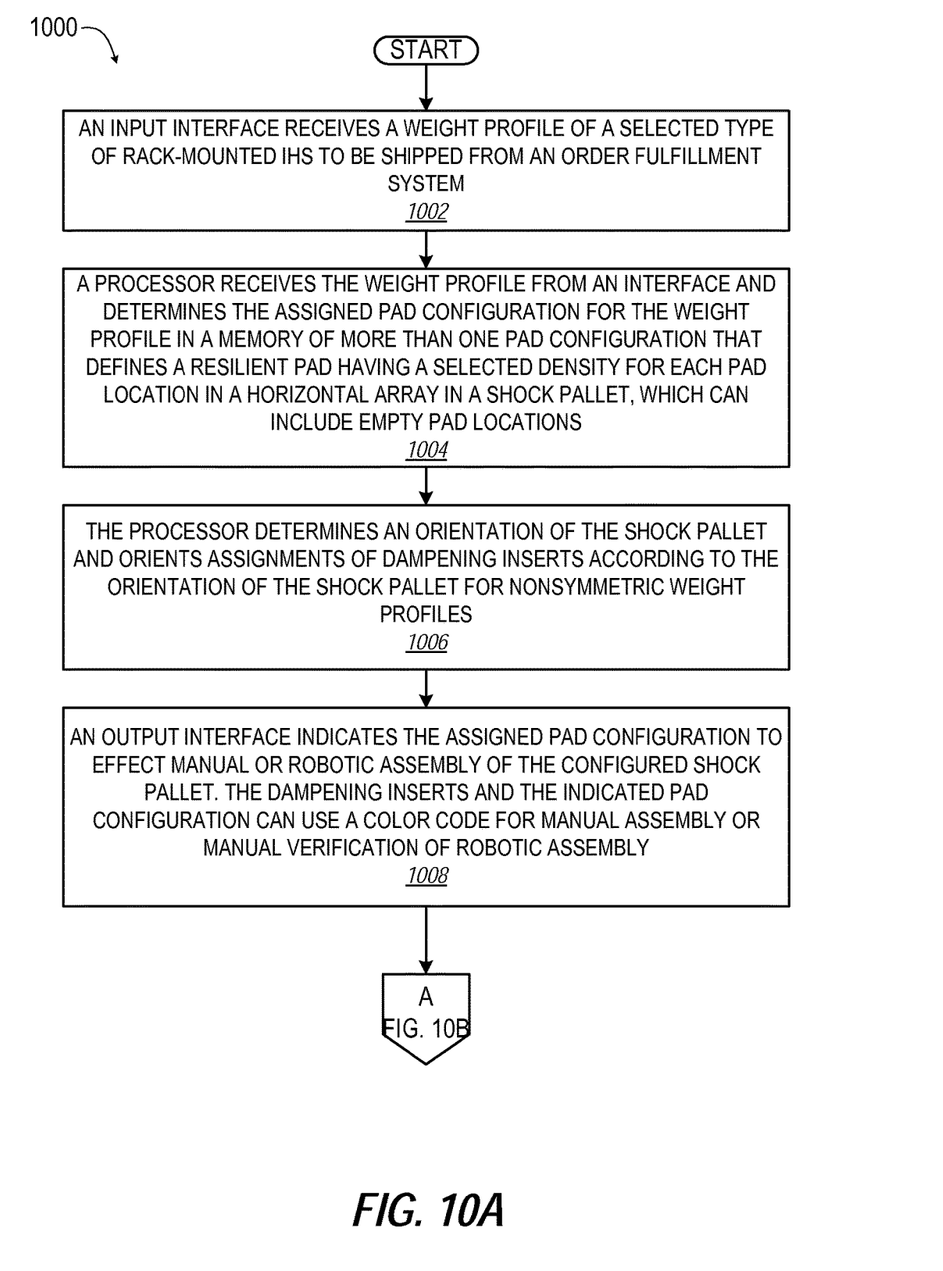
FIGS. 10A-10B illustrate a flow diagram of a method of configuring a shock pallet for accommodating different types of rack-mounted IHSes having different weight profiles, according to one embodiment.
Figure 10B:
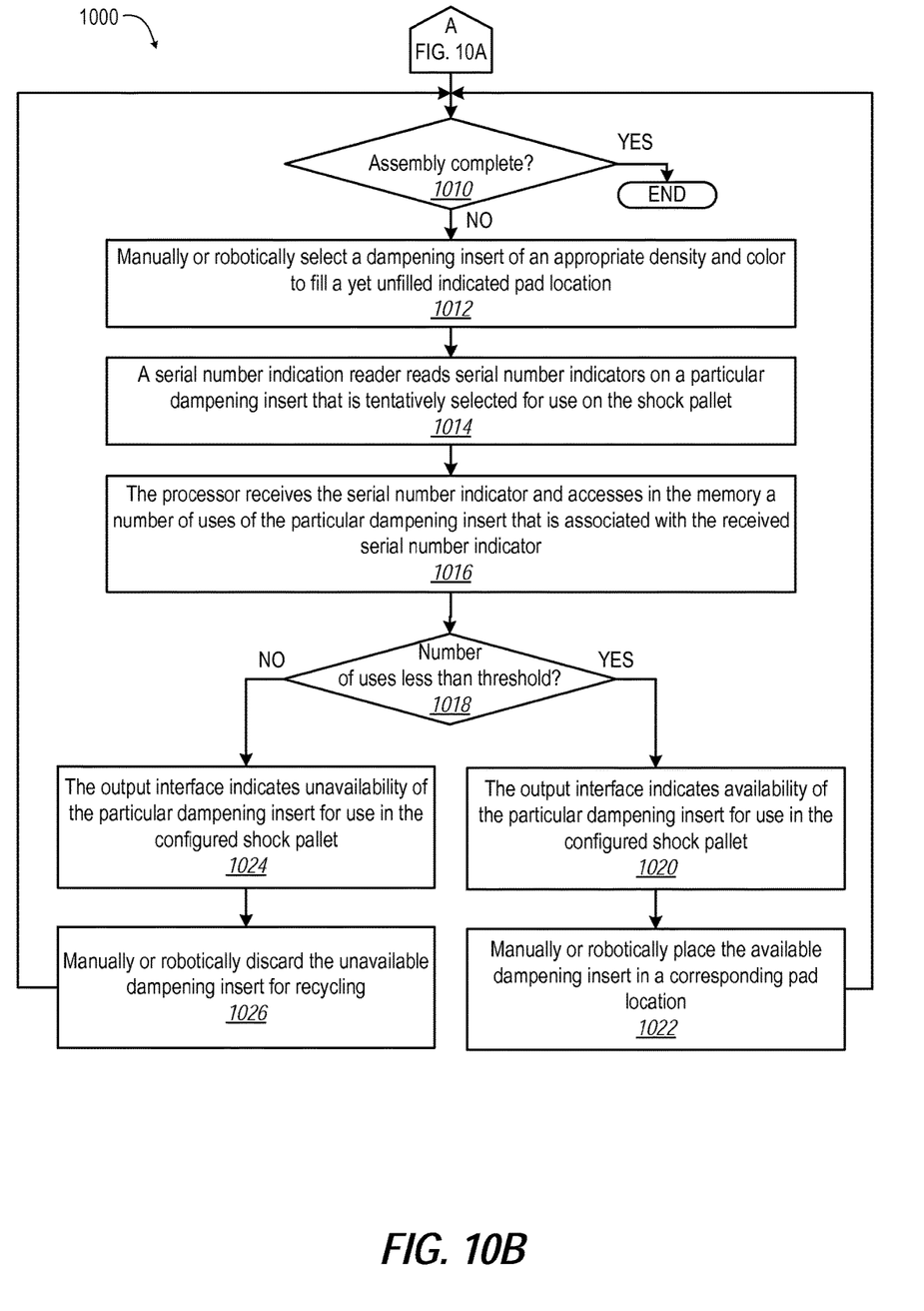

FIGS. 10A-10B illustrate a method 1000 of configuring a shock pallet for accommodating different types of rack-mounted IHSes having different weight profiles. In one embodiment, the method 1000 includes an input interface receiving a weight profile of a selected type of rack-mounted IHS to be shipped from an order fulfillment system (block 1002). A processor receives the weight profile from an interface and determines the assigned pad configuration for the weight profile. The assigned pad configuration is in a memory that contains more than one pad configuration. Each pad configuration designates a dampening insert having a selected density for each pad location in a horizontal array in a shock pallet. Some pad locations can be empty pad locations (block 1004). The processor determines an orientation of the shock pallet and orients assignments of dampening inserts according to the orientation of the shock pallet for nonsymmetrical weight profiles (block 1006). An output interface indicates the assigned pad configuration to effect manual or robotic assembly of the configured shock pallet. The dampening inserts and the indicated pad configuration can use a color code for manual assembly or manual verification of robotic assembly (block 1008). A determination is made as to whether placement of the dampening inserts according to the indicated pad configuration is complete (decision block 1010). In response to determining in decision block 1010 that the placement is complete, then method 1000 ends. In response to determining in decision block 1010 that the placement is not complete, then a dampening insert of an appropriate density and color is manually or robotically selected to fill a yet unfilled indicated pad location (block 1012). A serial number indication reader reads serial number indicators on a particular dampening insert that is tentatively selected for use on the shock pallet (block 1014). The processor receives the serial number indicator. The processor accesses the memory to determine a number of uses of the particular dampening insert that is associated with the received serial number indicator (block 1016). The processor determines whether the number of uses is less than a threshold (decision block 1018). In response to determining that the number of uses is less than the threshold, the output interface indicates availability of the particular dampening insert for use in the configured shock pallet (block 1020). The available dampening insert is manually or robotically placed in a corresponding pad location (block 1022). In response to determining that the number of uses is not less than the threshold, the output interface indicates unavailability of the particular dampening insert for use in the configured shock pallet (block 1024). The particular dampening insert is discarded for recycling (block 1026). After placement of the dampening insert in block 1022 or discarding of the insert in block 1026, method 1000 returns to decision block 1010 to continue assembling the shock pallet.

In the above described flow charts of FIGS. 9 and 10A-10B, one or more of the methods may be embodied in an automated manufacturing system that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is designated only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A configurable shock pallet to accommodate different types of rack-mounted information handling systems (IHSes) having different weight profiles, the configurable shock pallet comprising:

a bottom structure having a pair of parallel apertures to receive forklift tines;
a top deck to receive a rack-mounted IHS of a selected weight profile for shipping;
a horizontal array of pad locations designated between the bottom structure and the top deck;
more than one dampening insert assigned to respective pad locations of the horizontal array and each having a selected density of more than one density;
attaching components securing the top deck to the bottom structure, separated by the more than one dampening insert; and
usage tracking indicators attached to each of the dampening inserts.

2. The configurable shock pallet of claim 1, wherein:
the bottom structure comprises an upwardly open receptacle at each pad location to receive a provisioned dampening insert; and
the top deck comprises a downwardly open receptacle at each pad location that corresponds to an upwardly open receptacle in the bottom structure to secure the provisioned dampening insert between the bottom structure and the top deck.

3. The configurable shock pallet of claim 2, wherein the bottom structure comprises:
left, center and right longitudinal members that are separated by the pair of parallel apertures and that comprise the upwardly open receptacles; and
cross stringers that are attached respectively to each of the left, center and right longitudinal members and that cross under the pair of parallel apertures.

4. The configurable shock pallet of claim 3, wherein each of the left, center and right longitudinal members comprise four upwardly open rectangular receptacles.

5. The configurable shock pallet of claim 1, further comprising more than one top guides attached to a top surface of the top deck to laterally locate and stabilize the rack-mounted IHS.

6. The configurable shock pallet of claim 1, wherein each density of dampening insert is associated with a color that is indicated on the dampening insert, the configurable shock pallet further comprising a user reference that contains more than one pad configuration that indicates by color the density of each dampening insert for selected pad locations according to a weight profile of a selected type of rack-mounted IHS to be shipped.

7. The configurable shock pallet of claim 6, further comprising an orientation indicator attached to one of the bottom structure and the top deck, wherein one of the pad configurations is asymmetric and oriented according to the orientation indicator.

8. The configurable shock pallet of claim 1, wherein the dampening insert comprises a compliance element.

9. A method of configuring a shock pallet for accommodating different types of rack-mounted information handling systems (IHSes) having different weight profiles, the method comprising:
determining, by a processor of an information handling system (IHS), a weight profile of a selected type of rack-mounted IHS to be shipped;
accessing a pad configuration that designates a dampening insert having a selected density for each pad location of a horizontal array and that corresponds to the weight profile;
positioning, via a pallet manufacturing system, the dampening inserts of selected density according to the accessed pad configuration on a bottom structure;

attaching a top deck to the bottom structure, the top deck securing the positioned dampening inserts between the bottom structure and the top deck; and attaching usage tracking indicators to each of the dampening inserts.

10. The method of claim 9, further comprising:

tracking a number of uses of a particular dampening insert;

determining whether the particular dampening insert has been previously used in a configured shock pallet a threshold number of times; and positioning the particular dampening insert on the bottom structure in response to determining that the particular dampening insert has been previously used in a configured shock pallet less than the threshold number of times.

11. The method of claim 9, further comprising:

determining an orientation indicator on the bottom structure; and aligning the bottom structure with the pad configuration for a nonsymmetrical weight profile of the selected type of rack-mounted IHS.

12. The method of claim 9, wherein accessing a pad configuration that designates the dampening insert having the selected density comprises displaying a color indicator for each pad location that corresponds to a color of a selected density of dampening insert.

13. A shock pallet configuring system to configure a shock pallet for accommodating different types of rack-mounted information handling systems (IHSes) having different weight profiles, the system comprising:

an input interface that receives a weight profile of a selected type of rack-mounted IHS to be shipped;

a memory that contains more than one pad configuration that corresponds to a selected weight profile of a rack-mounted IHS and that designates a selected density of dampening insert assigned to respective pad locations of a horizontal array;

a processor in electronic communication with the memory and the input interface to receive the weight profile and which determines the assigned pad configuration for the weight profile of the more than one pad configuration that designates a dampening insert having a selected density for each pad location in a horizontal array in a shock pallet;

an output interface that indicates the assigned pad configuration to effect assembly of the configured shock pallet; and usage tracking indicators attached to each of the dampening inserts.

14. The shock pallet configuring system of claim 13, further comprising a robotic assembly apparatus, wherein the output interface comprises a control interface to the robotic assembly apparatus.

15. The shock pallet configuring system of claim 13, wherein the pad configuration comprises a nonsymmetrical pattern that corresponds to a non-symmetric weight profile, and the processor further determines an orientation of the shock pallet and to orient assignments of dampening inserts according to the orientation of the shock pallet.

16. The shock pallet configuring system of claim 13, further comprising a serial number indication reader, wherein:

each dampening insert comprises a serial number indicator;

the memory contains tracking data of uses of each dampening insert that is associated with a particular serial number indicator; and the processor is in electronic communication with the serial number indicator reader and receives the particular serial number indicator, identifies a number of uses of a particular dampening insert that is associated with the received serial number indicator, and indicates availability of the particular dampening insert for use in the configured shock pallet in response to determining that the number of uses is less than a threshold.

17. The shock pallet configuring system of claim 13, wherein:

the input interface comprises a network connection to an order fulfillment system; and the output interface comprises a user interface to display the pad configuration.

18. The shock pallet configuring system of claim 17, wherein the output interface displays the pad configuration by displaying a color indicator for each pad location that corresponds to a color of a selected density of dampening insert.

19. The shock pallet configuring system of claim 13, wherein:

the pad configuration comprises at least one empty pad location; and the output interface displays the at least one empty pad location.

* * * * *